(12) United States Patent
Montemurro et al.

(10) Patent No.: US 10,257,682 B2
(45) Date of Patent: Apr. 9, 2019

(54) METHOD AND SYSTEM FOR DEDICATED SHORT RANGE COMMUNICATION WITH TRAFFIC OFFLOAD

(71) Applicant: BlackBerry Limited, Waterloo (CA)

(72) Inventors: Michael Peter Montemurro, Toronto (CA); Stephen McCann, Southampton (GB); James Randolph Winter Lepp, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/585,864

(22) Filed: May 3, 2017

(65) Prior Publication Data

US 2018/0324544 A1   Nov. 8, 2018

(51) Int. Cl.
| | | |
|---|---|---|
| *H04W 16/14* | (2009.01) | |
| *H04W 72/12* | (2009.01) | |
| *H04W 4/80* | (2018.01) | |
| *H04W 4/90* | (2018.01) | |
| *H04L 5/00* | (2006.01) | |
| *H04L 12/803* | (2013.01) | |
| *H04W 4/04* | (2009.01) | |
| *H04W 4/40* | (2018.01) | |
| *H04B 7/0413* | (2017.01) | |
| *H04W 84/12* | (2009.01) | |

(52) U.S. Cl.
CPC ............. *H04W 4/80* (2018.02); *H04L 5/0062* (2013.01); *H04L 47/125* (2013.01); *H04W 4/046* (2013.01); *H04W 4/40* (2018.02); *H04W 4/90* (2018.02); *H04B 7/0413* (2013.01); *H04W 84/12* (2013.01)

(58) Field of Classification Search
CPC combination set(s) only.
See application file for complete search history.

(56) References Cited

U.S. PATENT DOCUMENTS

| | | | |
|---|---|---|---|
| 9,144,025 B2 | 9/2015 | Vaidya et al. | |
| 9,271,322 B2 | 2/2016 | Vaidya et al. | |
| 9,578,595 B2 | 2/2017 | Hedge et al. | |
| 9,819,701 B2 * | 11/2017 | Kalapatapu | ......... H04L 65/1016 |
| 2011/0317679 A1 | 12/2011 | Jain | |

(Continued)

OTHER PUBLICATIONS

Institute of Electrical and Electronics Engineers (IEEE), "802.11p-2010 IEEE Standard for Information Technology—Local and Metropolitan Area Networks—Specific Requirements", http://ieeexplore.ieee.org/servlet/opac?punumber=5514473, Jul. 23, 2010.

(Continued)

*Primary Examiner* — Cindy Trandai
(74) *Attorney, Agent, or Firm* — Moffat & Co

(57) ABSTRACT

A method at a computing device for dedicated short range communication with traffic offload, the method including utilizing a radio in a communications subsystem on the computing device for a first category of communications; determining, at the computing device, that a trigger condition has been met; and splitting operation of the radio in the communications subsystem of the computing device, the splitting comprising utilizing a first portion of the radio for the first category of communications and a second portion of the radio for a second category of communications.

17 Claims, 6 Drawing Sheets

(56) References Cited

U.S. PATENT DOCUMENTS

| | | | |
|---|---|---|---|
| 2012/0149310 A1* | 6/2012 | Tofighbakhsh | H04W 48/18 455/67.11 |
| 2013/0259101 A1 | 10/2013 | Earnshaw et al. | |
| 2014/0024382 A1* | 1/2014 | Zou | H04W 16/08 455/445 |
| 2014/0051346 A1 | 2/2014 | Li et al. | |
| 2015/0170429 A1 | 6/2015 | Denny et al. | |
| 2015/0181514 A1 | 6/2015 | Belghoul et al. | |
| 2015/0312831 A1* | 10/2015 | Sang | H04W 36/0083 370/236 |
| 2016/0087743 A1* | 3/2016 | El Ayach | H04W 52/242 455/452.1 |
| 2016/0219251 A1* | 7/2016 | Vare | H04H 20/62 |
| 2016/0255533 A1* | 9/2016 | Sirotkin | H04W 48/16 370/230 |
| 2016/0338062 A1* | 11/2016 | Rico-Alvarino | H04W 72/0453 |
| 2017/0064718 A1* | 3/2017 | Bharadwaj | H04W 72/0493 |
| 2017/0230939 A1* | 8/2017 | Rudolf | H04W 72/04 |
| 2018/0063763 A1* | 3/2018 | Gupta | H04W 16/08 |
| 2018/0206282 A1* | 7/2018 | Singh | H04W 88/06 |

OTHER PUBLICATIONS

Institute of Electrical and Electronics Engineers (IEEE), "802.11-2012 IEEE Standard for Information Technology—Telecommunications and Information Exchange Between Systems Local and Metropolitan Area Networks—Specific Requirements", http://ieeexplore.ieee.org/servlet/opac?punumber=6178209, Apr. 5, 2012.

Institute of Electrical and Electronics Engineers (IEEE), "802.11-2016 IEEE Standard for Information Technology—Telecommunications and Information Exchange Between Systems Local and Metropolitan Area Networks—Specific Requirements", http://ieeexplore.ieee.org/servlet/opac?punumber=7786993, Dec. 16, 2016.

Institute of Electrical and Electronics Engineers (IEEE), "1609.2-2016 IEEE Standard for Wireless Access in Vehicular Environments—Security Services for Applications and Management Messages", http://ieeexplore.ieee.org/servlet/opac?punumber=7426682, Mar. 7, 2016.

Institute of Electrical and Electronics Engineers (IEEE), "1609.3-2016 IEEE Standard for Wireless Access in Vehicular Environments (WAVE)—Networking Services", http://ieeexplore.ieee.org/servlet/opac?punumber=7458113, Apr. 22, 2016.

Institute of Electrical and Electronics Engineers (IEEE), "1609.4-2016 IEEE Standard for Wireless Access in Vehicular Environments (WAVE)—Multi-Channel Operation", http://ieeexplore.ieee.org/servlet/opac?punumber=7435226, Mar. 17, 2016.

International Searching Authority, International Search Report and Written Opinion of the International Searching Authority for International Application No. PCT/EP2018/059678, dated Jul. 18, 2018.

\* cited by examiner

METHOD AND SYSTEM FOR DEDICATED SHORT RANGE COMMUNICATION WITH TRAFFIC OFFLOAD

FIELD OF THE DISCLOSURE

The present disclosure relates to the radio applications, and in particular relates to radio usage for devices having both safety and non-safety applications.

BACKGROUND

Networking technologies such as a wireless local area network (WLAN) and cellular are being used more ubiquitously in various industries, including the automotive, rail, aeronautical and marine industries. The uptake of the use of such technologies will likely increase in coming years.

For vehicles, WLAN applications may be used for a variety of functions. A first use of the technology may be for an infotainment system. In particular, vehicles that become more connected may provide services such as streaming video to rear seat passengers, the ability to connect to social networks or play games online, among other options, while in a vehicle.

A second use for WLAN technology may be for safety applications. In particular, Intelligent Transportation Systems (ITS) provide for technology in which the software and communication systems are designed to enhance road safety and road traffic efficiency by providing communications to or from a vehicle, infrastructure, network and/or pedestrian or portable device.

A further use for WLAN technology in vehicles may be for traffic offloading. Specifically, Wi-Fi offloading is the use of a complementary network technology for delivering data originally targeted for a cellular network.

In a further embodiment, WLAN technology may be used for in-automobile communication for control and operation of the vehicle. Specifically, currently control of the various vehicle components is done through wired technology such as CANbus, Ethernet, among others. However, a possibility exists for vehicle control utilizing wireless technologies.

While the same WLAN radio could be used for all the above operations, this may compromise safety communications and therefore is typically avoided. Thus multiple WLAN radios are generally needed for vehicles, devices or applications having both safety and non-safety functionality, increasing costs for installing such systems.

BRIEF DESCRIPTION OF THE DRAWINGS

The present disclosure will be better understood with reference to the drawings, in which.

DETAILED DESCRIPTION OF THE DRAWINGS

Figure 1:
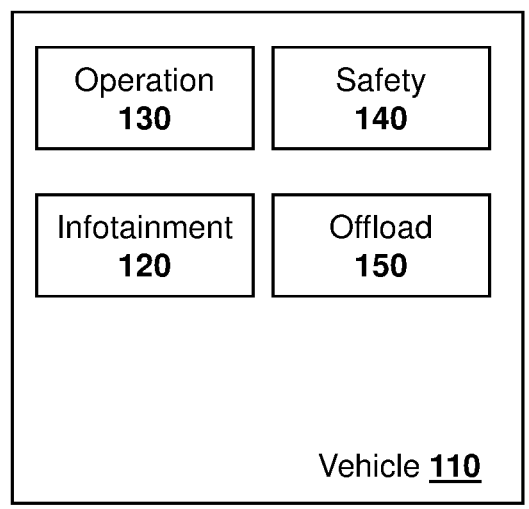
FIG. 1 is a block diagram showing a plurality of domains using WLAN radio within a vehicle.

The present disclosure provides a method at a computing device for dedicated short range communication with traffic offload, the method comprising: utilizing a radio in a communications subsystem on the computing device for a first category of communications; determining, at the computing device, that a trigger condition has been met; and splitting operation of the radio in the communications subsystem of the computing device, the splitting comprising utilizing a first portion of the radio for the first category of communications and a second portion of the radio for a second category of communications.

The present disclosure further provides a computing device for dedicated short range communication with traffic offload, the computing device comprising: a processor; and a communications subsystem, wherein the computing device is configured to: utilize a radio in the communications subsystem for a first category of communications; determine that a trigger condition has been met; and split operation of the radio in the communications subsystem, the splitting comprising utilizing a first portion of the radio for the first category of communications and a second portion of the radio for a second category of communications.

The present disclosure further provides a computer readable medium for storing program code, which, when executed by a processor of a computing device, cause the computing device to: utilize a radio in a communications subsystem of the computing device for a first category of communications; determine that a trigger condition has been met; and split operation of the radio in the communications subsystem, the splitting comprising utilizing a first portion of the radio for the first category of communications and a second portion of the radio for a second category of communications.

The present disclosure is described below using vehicle systems as an example. However, the present disclosure is not limited to vehicle systems and could be used, for example, in cases where a portable device is being used for a variety of purposes, including for safety applications, non-safety applications, or both safety and non-safety applications. Specifically, such portable device could be a user carried mobile device, a bicycle mounted computer, an infrastructure mounted device, among other options. Therefore, the use of the vehicle systems in the description below is merely provided for illustration.

WLAN may be used for safety applications for vehicles or pedestrians. For example, the use of WLAN technologies for safety are covered by the Institute of Electrical and Electronics Engineers (IEEE) Standard 802.11p-2010, "IEEE Standard for Information Technology—Telecommunications and Information Exchange Between Systems—Local and Metropolitan Area Networks—Specific Requirements", the contents of which are incorporated here by reference. This standard has since been incorporated into the publications of IEEE Standard 802.11-2012 and IEEE Standard 802.11-2016 as the is otherwise known as the "Outside the Context of a BSS" (OCB) and is used for medium access control (MAC) and physical (PHY) layers.

Similarly, the IEEE Standard 1609.2-2016, "IEEE Standard for Wireless Access in Vehicle Environments—Security Services for Applications and Management Messages", IEEE Standard 1609.3-2016 "IEEE Standard for Wireless Access in Vehicle Environments (WAVE)—Networking Services", and IEEE Standard 1609.4-2016, "IEEE Standard for Wireless Access in Vehicle Environments (WAVE)—Multi-channel Operation" the contents of all of which are incorporated herein by reference, provides for MAC layer and higher functions such as traffic scheduling, traffic priority and security.

Such safety radios are used as part of intelligent transportation systems, which are systems in which a plurality of devices communicate to allow for the transportation system to make better informed decisions with regard to transportation traffic management, as well as allowing for safer and more coordinated decision-making in transportation networks. ITS system components may be provided within vehicles, as part of fixed infrastructure, such as bridges or at intersections, and for use by others using the transportation system, including pedestrians or bicyclists.

In many cases, a computing station within the ITS system must be capable of reacting quickly. In particular, due to vehicle speeds and range of communications, typically a computing station needs to receive and/or respond to communications with very low latency.

OCB was originally defined to make use of IEEE 802.11a MAC and PHY layers, using a single radio technology. Specifically, such single radio technology uses a single input, single output (SISO) system having a single antenna.

Further, the IEEE 802.11 specification has introduced IEEE 802.11n and IEEE 802.11ac, which make use of multiple radio technology. In particular, multiple input, multiple output (MIMO) technology provides the use of plurality of antennas. The use of a MIMO radio has advantages for safety applications because it increases the overall range of the device, reduces the medium occupancy time, and with suitable encoding such as low-density parity codes (LDCP), may increase the reliability of communications. LDCP is a coding procedure in recent versions of IEEE 802.11 that provides better reception and fringe coverage. Further, future amendments to the 802.11 specification will further also likely support MIMO technology.

In accordance with the embodiments described herein, the use of a safety radio with MIMO operation may allow, in certain situations, the conversion of the MIMO radio into a simultaneous dual band (SDB) mode for use with other vehicle systems. As used herein, simultaneous dual band refers to the taking of multiple radio chains and making use of the multiple radio chains for communicating on separate independent networks. This would allow, in some circumstances, use of a single radio for a plurality of the vehicle systems while still ensuring the safety-critical radio operation is not compromised through the radio sharing. In other embodiments, the radio with MIMO operation may be used for a plurality of vehicle systems, in which case the conversion into SDB commences the use of safety-critical radio operation while maintaining a single radio for the plurality of vehicle systems. Note that the term safety-critical may also imply safety warning and safety information and does not necessarily imply an information connection that is critical to the safe operation of the vehicle.

Reference is now made to FIG. 1, which shows a block diagram of a vehicle in which the various systems are provided. These systems or subsystems are sometimes called domains. In particular, vehicle 110 includes an infotainment system 120, which is typically provided to users within the passenger compartment of the vehicle.

The operation WLAN system 130 provides wireless connectivity within the engine compartment or the mechanical areas for internal systems within the automobile. These can include Controller Area Network (CAN) bus systems for systems such as braking, engine operation, exhaust monitoring, among other operations.

The safety radio system 140 provides connectivity between the vehicle 110 and other traffic management units for safety purposes. Specifically, the communication may be vehicle to vehicle (V2V), vehicle to infrastructure (V2I), vehicle to network (V2N) or vehicle to pedestrian (V2P). The generalized communication may be referred to as a V2X communication.

The WLAN offload system 150 provides the ability for the automobile to establish network connectivity to a WLAN to offload data traffic to internet. Internet traffic may be sent over a cellular radio network when a vehicle is mobile, but be offloaded to a WLAN network when available. Offload may be used, for example, to update applications or services within the vehicle, to provide data to a monitoring station, to provide data to applications or services on the vehicle, among other functionality. In some cases, data traffic can be routed between any other system on the vehicle and the WLAN offload system 150. Some services or applications may operate over both the cellular radio network and the offload network, but others may be restricted to one or the other.

An external antenna for a WLAN system for the vehicle 100 in FIG. 1 could be similar in architecture to a converged mobile device, such there could be a cellular radio, a global positioning system (GPS) radio, as well as a WLAN radio using the external antenna.

As described above, typically the safety radio system 140 does not share a radio with any of the other systems within the vehicle 110 to avoid compromising the safety radio. However, in accordance with the embodiments of the present disclosure, the safety radio system 140 may be combined with one or more of the other vehicle systems in certain circumstances.

For example, in one case, the safety radio system 140 may be combined with the WLAN offload system 150, as described below.

MIMO WLAN Radio with a Simultaneous Dual-Band (SDB) Mode

In a first embodiment of the present disclosure, a multiple receive/transmit MIMO radio system may, in some circumstances, operate as a simultaneous dual band radio. Thus, when certain criteria are met, the MIMO radio may be switched to function as multiple SISO radios.

Figure 2:
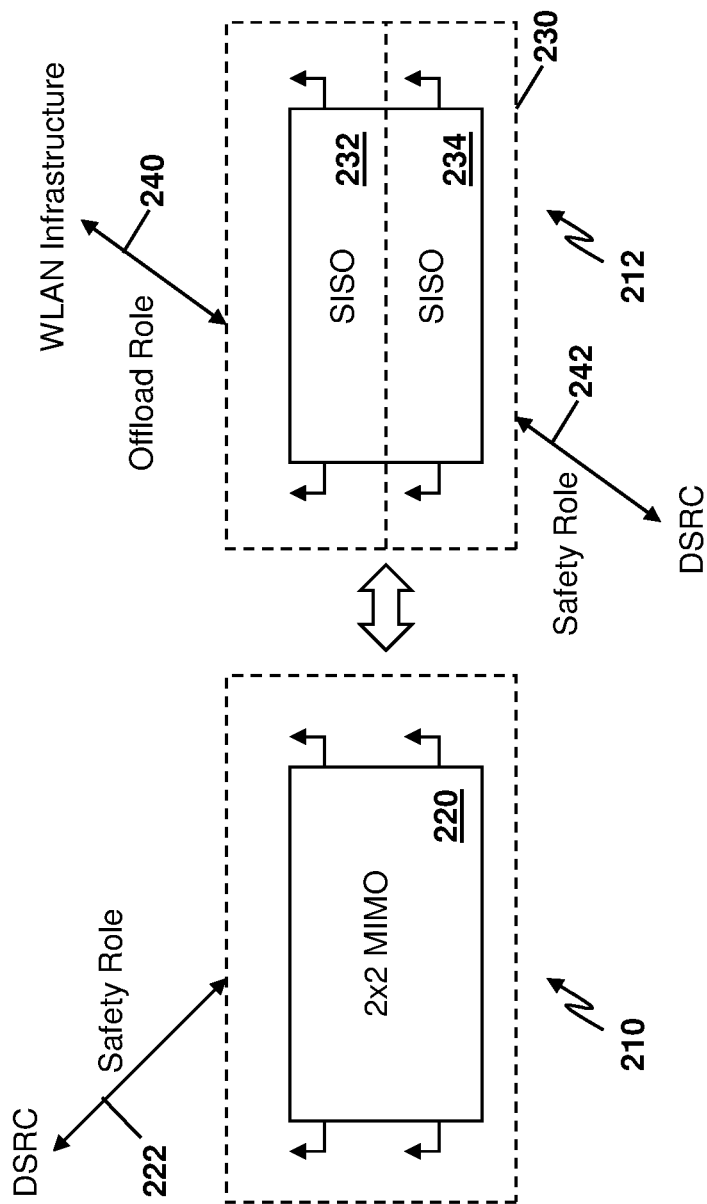
FIG. 2 is a block diagram showing a 2×2 MIMO radio capable of operating as two simultaneous SISO dual band radios.

References now made to FIG. 2. In the case of a 2×2 MIMO radio, that is a radio having two transmit chains and two receive chains, the switch to a simultaneous dual band mode would allow one of the radio chains to continue to operate in a safety role, while the other radio chain may operate for an offload role, offloading traffic to WLAN.

In particular, in the embodiment of FIG. 2, a safety radio mode 210 is shown on the left of the diagram and a split mode 212 is shown on the right of the diagram.

In the safety radio mode, the radio 220 acts in a 2×2 MIMO mode. As shown by arrow 222, the transmissions to and from radio 220 are safety radio transmissions. In the example of FIG. 2, the safety radio transmissions are Dedicated Short Range Communications (DSRC) transmissions providing safety radio communications.

Conversely, in the split mode 212, the radio 230 is divided into a first SISO radio 232 and a second SISO radio 234. Thus, in the split mode 212, the radio operates in an SDB mode with the two radios operating independently.

In the embodiment of FIG. 2, the SISO radio 232 is used for the offload role and communications, as shown by arrow 240, are sent to the WLAN infrastructure.

Similarly, the SISO radio 234 operates in the safety role and the communications shown by arrow 242 are for the DSRC communications.

Figure 3:
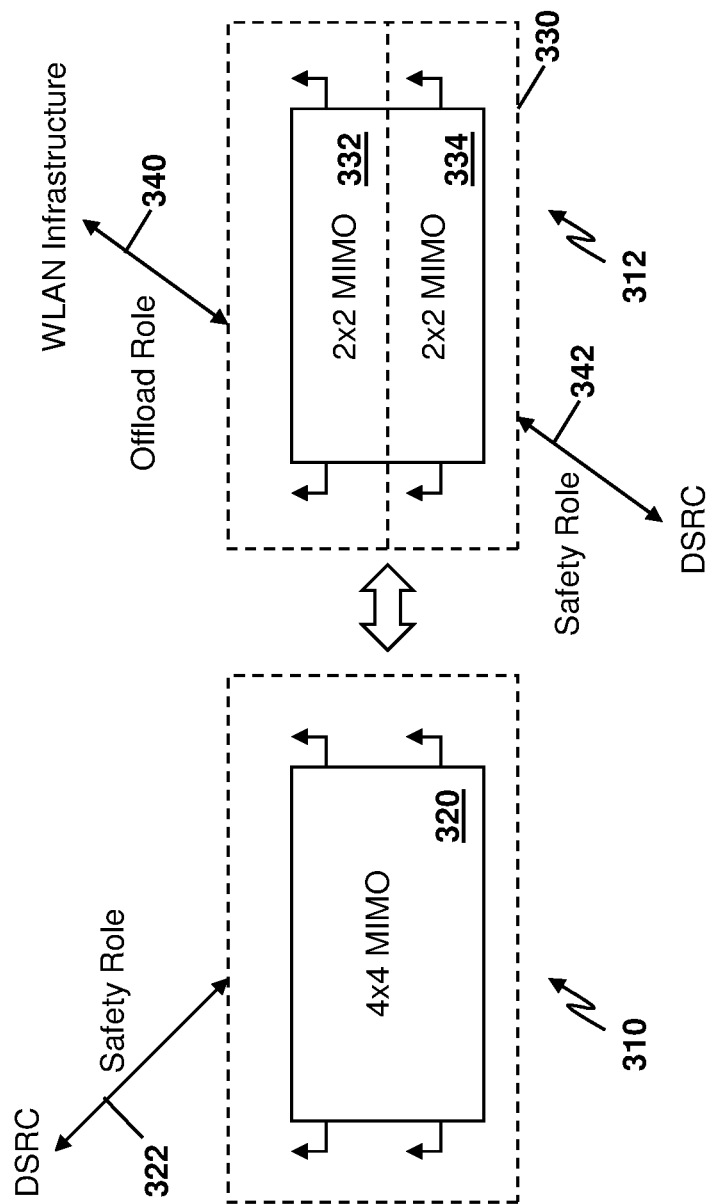
FIG. 3 is a block diagram showing a 4×4 MIMO radio capable of operating as two simultaneous 2×2 MIMO dual band radios.

For a more complex radio, for example a 4×4 MIMO radio, instead of an SISO radio, the radio could be converted to two sets of 2×2 MIMO radios for the SDB mode. Reference is now made to FIG. 3.

As seen in FIG. 3, in the safety mode 310, the radio 320 is a 4×4 MIMO radio. In the safety mode 310, DSRC communications, shown by arrow 322, are sent.

In the split mode 312, the radio 330 is divided into two 2×2 MIMO radios, namely 2×2 MIMO radio 332 and 2×2 MIMO 334.

Radio 332 is used for communications with the WLAN infrastructure for an offload role, as shown by arrow 340. Similarly, radio 334 is used for safety role for DSRC communications, as shown by arrow 342.

In accordance with embodiments of FIGS. 2 and 3 above, the safety role of the radio continues with the DSRC transmissions even in the split mode, so that from the DSRC system point of view, there is continuity between the MIMO and SDB modes.

Figure 4:
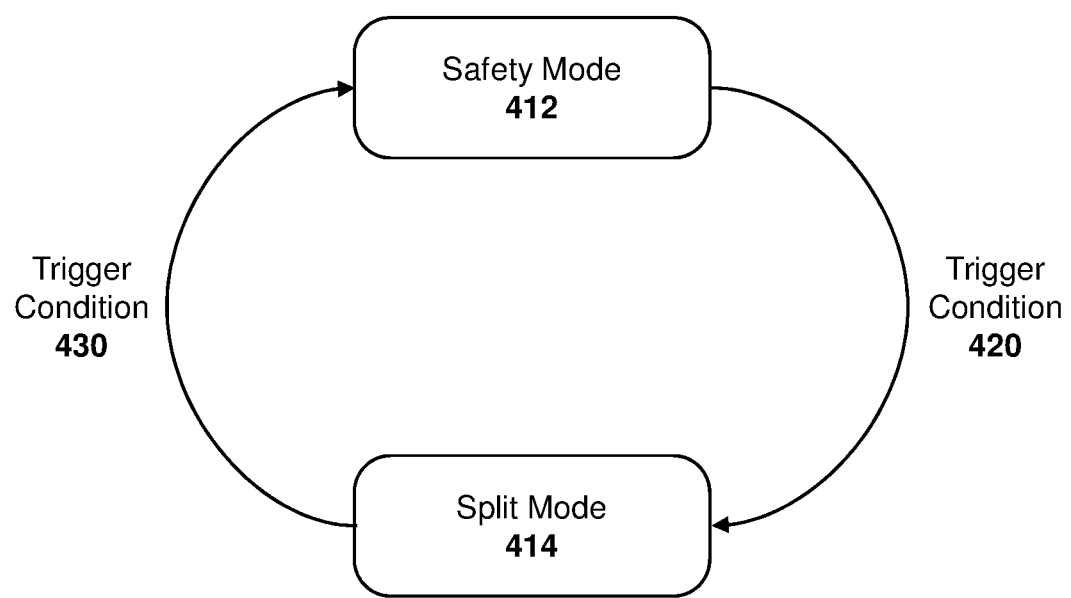
FIG. 4 is a state diagram showing transitions between a safety mode and a split mode.

As provided above, the transition from the safety mode 210 or 310 to the split mode 212 or 312 is performed in certain conditions. Specifically, a trigger condition causes the WLAN radio to transition from one mode to the other. In the embodiments described herein, the two modes are the safety mode and the split mode. Reference is now made to FIG. 4, which shows an example state diagram for the system.

In the embodiment of FIG. 4, the radio may operate in one of two modes, namely a safety mode 412 and a split mode 414. In safety mode 412 the radio operates in a MIMO operation, while in split mode 414 the radio operates in an SDB operation.

To transition from the safety mode 412 to the split mode 414, a trigger condition 420 must be met.

Similarly, to transition from the split mode 414 to the safety mode 412, a trigger condition 430 must be met.

In some embodiments, trigger condition 420 and trigger condition 430 are symmetrically opposite of each other. However, typically, the trigger conditions 420 and 430 will be asymmetric.

In accordance with the embodiments described herein, various factors could be used for trigger conditions 420 and 430. Examples may include a speed of a vehicle, the state of an engine on a vehicle, the state of applications within the vehicle, environmental conditions, location, among other factors.

For example, the trigger to switch the radio from the safety mode 412 to the split mode 414 may be determined when the speed of an automobile is less than a certain threshold. For example, in one case, if the vehicle is travelling at 5 km/h or less, this may indicate that the safety radio is less critical and allow for the transition to the split mode for offloading WLAN communications. In other cases, if the engine of the vehicle is turned off, then this may indicate that the radio may transition to the split mode 414.

In other cases, applications within the vehicle may indicate a need for WLAN offloading and in this case, if other conditions are met then the WLAN radio may transition to the split mode 414.

In other cases, the location of the vehicle may be used for a triggering condition. Specifically, if the vehicle is in a parking lot, in some embodiments this may allow for the transition to the split mode 414. In other cases, geo-fenced locations may be utilized for such location triggering. In other cases, the location may comprise being within a threshold distance to a particular location, such as a gas station which has facilities for WLAN offloading. Other examples are possible.

In other cases, environmental conditions may be used for a triggering condition or part of a triggering condition. For example, if a vehicle is proceeding through heavy rain or fog, where visibility is diminished, then in some cases this may cause the computing device on the vehicle to remain in the safety mode.

In some cases, various conditions may be combined prior to the trigger condition 420 being met. Thus for example, if the speed of the vehicle is below 5 km/h and the vehicle is within a geographic location such as a parking lot then the trigger conditions be met and the radio may transition for the split mode 414.

Conversely, the switch from split mode 414 to safety mode 412 may use different thresholds or triggers. In some cases, in order to avoid a ping-pong between modes, the threshold to transition back to the safety radio may involve higher thresholds. For example, if the vehicle is travelling at more than 7 km/h then the transition from the split mode 414 to the safety mode 412 may occur. In other cases, the turning on the engine may cause the transition. In other cases, if applications on the vehicle are finished with the offloading operations then the radio may transition regardless of the speed or engine state. In other embodiments, if a vehicle leaves an area or exits a geo-fenced area then the safety mode 412 may be triggered. For example, crossing a geofence or other boundary.

In other cases, the vehicle entering a geo-fenced area may cause a transition to the safety mode 412 regardless of the speed of the vehicle. For example, if the vehicle is approaching a dangerous intersection then the safety mode 412 may be triggered regardless of the speed of the vehicle.

Further, exceptions and use cases may modify threshold settings or be encoded within an SDB policy.

In other cases, emergency beacons could be transmitted or received by the automobile in the offload role of the split mode, which may be orthogonal to those used by the MIMO DSRC system prior to the mode switch and the safety role of the split mode. In other embodiments, emergency beacons may be received by a different system on the automobile, which then act as a trigger to a mode switch. The SDB policy may include extra information for such an emergency mode. For example, an automobile in an emergency situation may switch to the SDB mode at higher speeds. Such emergency beacons could be transmitted to other cars, fire trucks, among other vehicles, indicating the location and other useful information. Examples of emergency beacons include Basic Safety Messages (BSM) or Cooperative Awareness Messages (CAM) and other types of messages.

Reference is now made to Table 1, which shows possible trigger conditions to transition between modes.

TABLE 1

Example State Transition between Safety and Split Modes

| Current Mode | Condition Change | | | Target Mode |
|---|---|---|---|---|
| | Engine (ON/OFF) | Speed (High/Low) | Application Trigger (Yes/No) | |
| Safety | ON | Low | Yes | Split |
| Split | ON | High | Yes | Safety |
| Safety | OFF | Low | Yes | Split |
| Split | ON | Low | No | Safety |

In Table 1 above, the low speed and high speed thresholds could be different, depending on the which of transitions 420 or 430 are being considered. For example, the speed might be low if less than 5 km/h for transition 420, and may be high is greater than 7 km/h for transition 430.

When the split mode is enabled, one radio chain is dedicated to the safety role while the other radio operates in the offload role in one embodiment. The safety role radio operates in the DSRC band in one embodiment, while the offload radio operates in other bands that do not interfere with the safety role.

When switching from safety mode to split mode, a 2×2 MIMO radio could also re-band one of its SISO chains, so a 2×2 MIMO radio operating in the safety role with DSRC in the 5.9 GHz could allow one of its radio to re-band to the WLAN's 5 GHz band or even the 2.4 GHz band for the offload role in the split mode.

When the split mode is enabled, the offload role radio may, in some embodiments, begin scanning for WLANs that match a list of configured profiles. For example, these profiles may be stored within a SDB policy. If a matching WLAN is found, the device may then attempt to connect to the network and established Internet connectivity. Once connectivity has been established, the offload role radio maintains connectivity until it goes out of range or the split mode is disabled.

If the offload role is required after transition from the split mode, the offload role radio may hand over to another technology such as cellular technology so that the safety mode may be resumed.

With regard to signaling, either the automobile or the infrastructure network may advertise its presence or capabilities. This may be done, for example, by using extended capability bits, Access Network Query Protocol (ANQP), service discovery, among other options.

The automobile or vehicle may signal the DSRC network to indicate that it is in SDB mode operation. Although this should have no effect on the DSRC continuity, it may inform the DSRC network that this vehicle has a reduced bandwidth or no longer requires DSRC system information of a certain type. For example, a vehicle that is moving at very slow speeds may not require high speed motion DSRC event data in some cases.

Similarly, when transitioning to safety mode, the computing device on the automobile or vehicle may signal the DSRC network to indicate it is in the safety mode, and potentially that high speed motion DSRC event data is now required.

Once the offload role has started, the WLAN infrastructure link may be monitored to determine if the WLAN infrastructure link is going down. For example, a vehicle moving away from an access point may cause the infrastructure link to go down. To maintain data connectivity, when exiting the offload role, a change in routing of traffic to another technology such as cellular may be needed.

The offload role radio could be used as a client or as an access point, depending on conditions. Therefore, vehicles could distribute media to other systems within the vehicle at slow speeds. For example, at a gas station or a car dealership, diagnostic transfers or upgrades to the vehicle systems may occur.

If the vehicle has an active cellular connection such as a long-term evolution (LTE) connection, traffic may be rerouted from the LTE backhaul to the offload role radio comprising the local WLAN connection, at a facility that supports such WLAN offloading. For example, a gas station, or electrical charging station may support such functionality. The WLAN communication link can be used to communicate with an electrical charging station to both exchange parameters about the charging operation as well as connect to internet backhaul.

Based on the above, in the offload role of the SDB mode radio, the offloading may be used within locations such as gas stations, at the home of the vehicle owner, or in other situations where a relatively static short range WLAN communication link between the vehicle and infrastructure would be beneficial. Such cases typically involve very little mobility.

The offload role could be used for entertainment such as streaming content, navigation tools, or may be used for updating automobile system firmware or general data backhauling. The offload role could operate either as an access point, a client or a Group Owner (GO) for Wi-Fi Direct networks.

The safety role for the radio can include DSRC basic safety messages (BSM), C-ITS cooperative awareness messages (CAM), Decentralized Environmental Notification Message (DENM) or similar signaling. These and other V2X safety protocols operated between vehicles and with infrastructure to transfer specific safety related information and not just general purpose network connectivity.

However, the system could be used in other use cases and these are merely examples.

WLAN Radio with Dual Narrowband Capability

In a further embodiment, rather than a MIMO radio being split, a wideband/narrowband WLAN radio may be utilized. In this case, the wideband/narrowband radio may be capable of dual operation, where it can provide both a wideband and the narrowband channel simultaneously. These WLAN radios are typically provided as a single unit.

Thus, similar to the embodiments described above, the radio in the safety mode 412 uses both the wideband and narrowband radios, but when trigger conditions are met, a split mode 414 may be entered, where the wideband radio provides connectivity for a safety role and the narrow channel provides the offload role, or vice versa.

An example of narrowband WLAN radio is provided in the IEEE 802.11 Low Range, Low Power (LRLP) topic interest group (TIG) and also in the IEEE 802.11ba Wake Up Radio (WUR) task group (TG). Further, the technology can apply to any narrowband Internet of things (IOT) radio technologies that operate in the same unlicensed channels of bands as WLAN/DSRC.

RF/network Domains

In a further embodiment, the various operations in FIG. 1 including infotainment system 120, operation domain 130, WLAN offload domain 150 and safety domain 140 could use the same WLAN radio, but would be filtered and prioritized between the domains.

For example, safety critical radio operations could be given the highest priority and take precedence over any other of the domains. Such filtering may include level 2 frames, level 3 packets or level 7 commands, among other options.

The filtering may be used in conjunction with the split mode 414 in some cases. For example, the filtering may prioritize data for offloading.

In other cases, the filtering may be used with regards to the single radio mode. Triggers may indicate whether any data besides safety data is allowed to be transmitted. Thus if a vehicle is moving above a threshold speed, the radio may only be used for safety messages. However, if the vehicle is moving below a threshold speed then some data may be allowed besides safety messages. Any of the triggers described above could be used with this embodiment.

While the embodiments described above relate to vehicles, in other cases the embodiments above could be used with non-vehicle scenarios. For example, a mobile device that a user is carrying could use the above techniques to divide a WLAN radio into various modes. In one case, the user of the mobile device could be approaching a dangerous intersection. In this case the WLAN resources may be dedicated to safety radio functionality. Once the user leaves the area of the dangerous intersection, a split mode of operation could resume.

Other examples would be evident to those skilled in the art having regard to the above.

Further, while the above describes one mode as a safety mode, in other cases the radio may be dedicated to a single type of communication that is not related to safety. Thus, for example, the MIMO radio could be used for other high importance data transfer that is not necessarily safety related.

The above therefore provides for the efficient use of radio resources for more than one service without the expense of extra hardware for a second WLAN radio.

The modules and devices described above may be any computing device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 5:
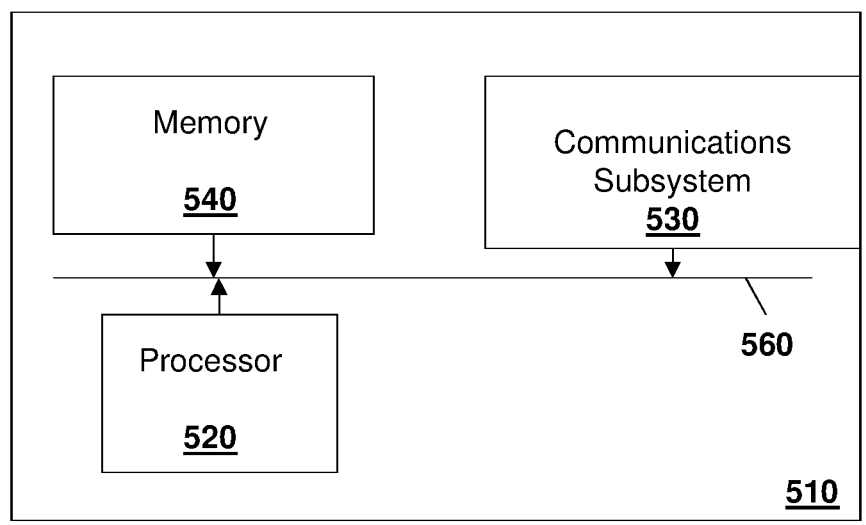
FIG. 5 is a block diagram of a simplified computing device capable of being used with the embodiments of the present disclosure.

One simplified diagram of a computing device is shown with regard to FIG. 5.

In FIG. 5, device 510 includes a processor 520 and a communications subsystem 530, where the processor 520 and communications subsystem 530 cooperate to perform the methods of the embodiments described above. Communications subsystem 520 may, in some embodiments, comprise multiple subsystems, for example for different radio technologies. In accordance with the embodiments described above, communications subsystem 520 may further include a MIMO WLAN transceiver that could, in certain circumstances, be split into multiple independent transceivers.

Processor 520 is configured to execute programmable logic, which may be stored, along with data, on device 510, and shown in the example of FIG. 5 as memory 540. Memory 540 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 540, device 510 may access data or programmable logic from an external storage medium, for example through communications subsystem 530.

Communications subsystem 530 allows device 510 to communicate with other devices or network elements. Communications subsystem 530 allows any of the communications types described above, including cellular, Bluetooth™, Wi-Fi, WLAN, DSRC, NFC, WUR, NAN, among other options.

Communications between the various elements of device 510 may be through an internal bus 560 in one embodiment. However, other forms of communication are possible.

Further, if the computing stations is a mobile device, one example device is described below with regard to FIG. 6.

Mobile device 600 may comprise a two-way wireless communication device having voice or data communication capabilities or both. Mobile device 600 generally has the capability to communicate with other computer systems on the Internet. Depending on the exact functionality provided, the mobile device may be referred to as a data messaging device, a two-way pager, a wireless e-mail device, a smartphone, a cellular telephone with data messaging capabilities, a wireless Internet appliance, a wireless device, a user equipment, or a data communication device, as examples.

Where mobile device 600 is enabled for two-way communication, it may incorporate a communication subsystem 611, including a receiver 612 and a transmitter 614, as well as associated components such as one or more antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate.

Network access requirements will also vary depending upon the type of network 619. In some networks network access is associated with a subscriber or user of the mobile device 600. A mobile device may require a removable user identity module (RUIM) or a subscriber identity module (SIM) card in order to operate on a network. The SIM/RUIM interface 644 is normally similar to a card-slot into which a SIM/RUIM card can be inserted and ejected. The SIM/RUIM card can have memory and hold many key configurations 651, and other information 653 such as identification, and subscriber related information. In other cases, rather than a network 619, mobile device 600 may communicate with a non-access node, such as a vehicle, roadside infrastructure, another mobile device, or other peer-to-peer communication.

When required network registration or activation procedures have been completed, mobile device 600 may send and receive communication signals over the network 619. As illustrated in FIG. 6, network 619 can include multiple base stations communicating with the mobile device.

Signals received by antenna 616 through communication network 619 are input to receiver 612, which may perform such common receiver functions as signal amplification, frequency down conversion, filtering, channel selection and the like. Analog to digital (A/D) conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog (D/A) conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile device 600 generally includes a processor 638 which controls the overall operation of the device. Communication functions, including data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem or DSRC subsystem, and any other device subsystems generally designated as 642. Serial port 630 could include a USB port or other port known to those in the art.

Figure 6:
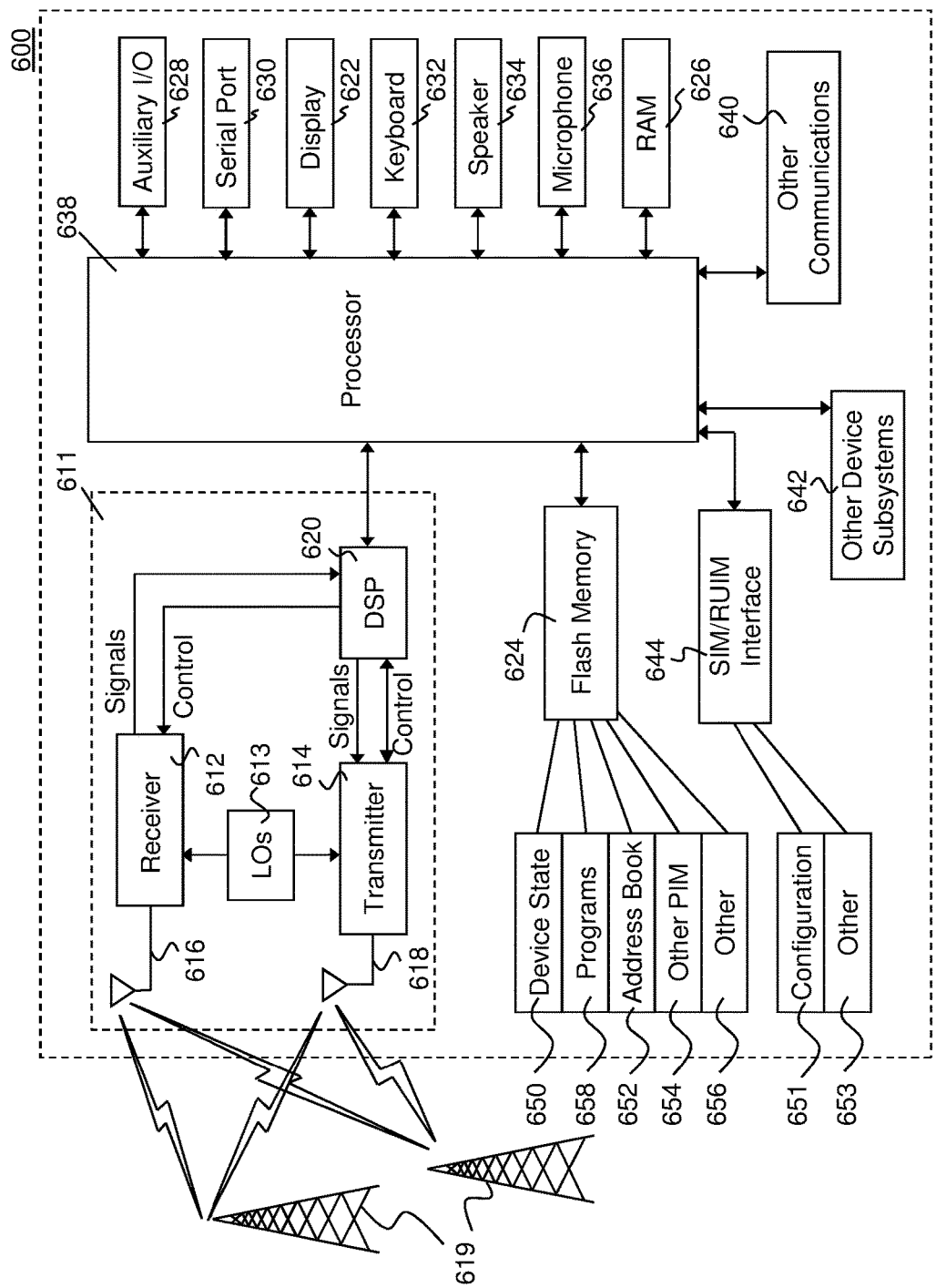
FIG. 6 is a block diagram of an example mobile device capable of being used with the embodiments of the present disclosure.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the processor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 1058 and program data storage 650, 652, 654 and 1056. These different storage types indicate that each program can allocate a portion of flash memory 624 for their own data storage requirements. Processor 638, in addition to its operating system functions, may enable execution of software applications on the mobile device. A predetermined set of applications that control basic operations, including at least data and voice communication applications for example, will normally be installed on mobile device 600 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, messages, calendar events, voice mails, appointments, and task items. Further applications, including productivity applications, social media applications, games, among others, may also be loaded onto the mobile device 600 through the network 619, an auxiliary I/O subsystem 628, serial port 630, short-range communications subsystem 640 or any other suitable subsystem 642, and installed by a user in the RAM 626 or a non-volatile store (not shown) for execution by the processor 638. Such flexibility in application installation increases the functionality of the device and may provide enhanced on-device functions, communication-related functions, or both.

In a data communication mode, a received signal such as a text message or web page download will be processed by the communication subsystem 611 and input to the processor 638, which may further process the received signal for output to the display 622, or alternatively to an auxiliary I/O device 628.

A user of mobile device 600 may also compose data items such as messages for example, using the keyboard 632, which may be a complete alphanumeric keyboard or telephone-type keypad, either physical or virtual, among others, in conjunction with the display 622 and possibly an auxiliary I/O device 628. Such composed items may then be transmitted over a communication network through the communication subsystem 611.

Where voice communications are provided, overall operation of mobile device 600 is similar, except that received signals may typically be output to a speaker 634 and signals for transmission may be generated by a microphone 636. Alternative voice or audio I/O subsystems, such as a voice message recording subsystem, may also be implemented on mobile device 600. Although voice or audio signal output is preferably accomplished primarily through the speaker 634, display 622 may also be used to provide an indication of the identity of a calling party, the duration of a voice call, or other voice call related information for example.

Serial port 630 in FIG. 6 may be implemented in a mobile device for which synchronization with a user's desktop computer (not shown) may be desirable, but is an optional device component. Such a port 630 may enable a user to set preferences through an external device or software application and may extend the capabilities of mobile device 600 by providing for information or software downloads to mobile device 600 other than through a wireless communication network. As will be appreciated by those skilled in the art, serial port 630 can further be used to connect the mobile device to a computer to act as a modem or for charging a battery on the mobile device.

Other communications subsystems 640, such as a short-range communications subsystem, is a further component which may provide for communication between mobile device 600 and different systems or devices, which need not necessarily be similar devices. For example, the subsystem 640 may include an infrared device and associated circuits and components or a Bluetooth™ or Bluetooth™ Low Energy communication module to provide for communication with similarly enabled systems and devices. Subsystem 640 may further include a WUR radio. Subsystem 640 may further include a DSRC radio. Subsystem 640 may further include non-cellular communications such as Wi-Fi or WiMAX, or near field communications, and in accordance with the embodiments above such radio may be capable of being split in some circumstances.

Mobile device 600 may further includes a sensor subsystem 1060, providing processor 638 with data from a variety of sensors on the mobile device. For example, in FIG. 6 sensors include accelerometer 662, gyroscope 664, GPS 666, altimeter 668, and other sensors 670. Other sensors 670 could be any sensor providing information to processor 638 through sensor subsystem 660.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device for dedicated short range communication with traffic offload, the method comprising:

utilizing a radio in a communications subsystem on the computing device for a first category of communications;

determining, at the computing device, that a trigger condition has been met; and splitting operation of the radio in the communications subsystem of the computing device, the splitting comprising utilizing a first portion of the radio for the first category of communications and a second portion of the radio for a second category of communications;

wherein the splitting comprises one of:

dividing the radio into a simultaneous dual band radio using a part of the MIMO WLAN radio as the first portion of the radio and using a remainder of the MIMO WLAN radio as the second portion of the radio, when the radio in the communications subsystem is a multiple input, multiple output (MIMO) wireless local area network (WLAN) radio; or using one of the wideband or narrowband channels as the first portion of the radio and using the other of the wideband or narrowband channels as the second portion of the radio, when the radio in the communications subsystem is wireless local area network (WLAN) radio having simultaneous wideband and narrowband channels;

wherein the computing device is on a vehicle, and wherein the trigger condition comprises any one or combination of: a speed of the vehicle falling below a threshold; a location of the vehicle; a status of operation of the vehicle; environmental conditions; or application triggers for applications on the computing device.

2. The method of claim 1, wherein the first category of communications comprises safety radio communications.

3. The method of claim 2, wherein the second category of communications comprises data offloading communications.

4. The method of claim 3, wherein the splitting further comprises assigning a first frequency band to the first portion of the radio for safety communications and a second frequency band to the second portion of the radio for data offloading communications.

5. The method of claim 4, wherein the second frequency band is assigned to avoid interference with the first frequency band.

6. The method of claim 1, wherein the computing device is a mobile device, and wherein the trigger condition comprises any one or combination of: a location of the mobile device; or application triggers for applications on the mobile device.

7. The method of claim 1, further comprising:
determining, at the computing device, that a second trigger condition has been met; and
resuming utilizing the radio in the communications subsystem on the computing device for the first category of communications.

8. The method of claim 7, wherein the trigger condition and the second trigger condition are non-symmetric.

9. A computing device for dedicated short range communication with traffic offload, the computing device comprising:
a processor; and
a communications subsystem,
wherein the computing device is configured to:
utilize a radio in the communications subsystem for a first category of communications;
determine that a trigger condition has been met; and
split operation of the radio in the communications subsystem, the splitting comprising utilizing a first portion of the radio for the first category of communications and a second portion of the radio for a second category of communications;
wherein the splitting comprises one of:
dividing the radio into a simultaneous dual band radio using a part of the MIMO WLAN radio as the first portion of the radio and using a remainder of the MIMO WLAN radio as the second portion of the radio, when the radio in the communications subsystem is a multiple input, multiple output (MIMO) wireless local area network (WLAN) radio; or
using one of the wideband or narrowband channels as the first portion of the radio and using the other of the wideband or narrowband channels as the second portion of the radio, when the radio in the communications subsystem is wireless local area network (WLAN) radio having simultaneous wideband and narrowband channels;
wherein the computing device is on a vehicle, and wherein the trigger condition comprises any one or combination of: a speed of the vehicle falling below a threshold; a location of the vehicle; a status of operation of the vehicle; environmental conditions; or application triggers for applications on the computing device.

10. The computing device of claim 9, wherein the first category of communications comprises safety radio communications.

11. The computing device of claim 10, wherein the second category of communications comprises data offloading communications.

12. The computing device of claim 11, wherein the computing device is configured to split by assigning a first frequency band to the first portion of the radio for safety communications and a second frequency band to the second portion of the radio for data offloading communications.

13. The computing device of claim 12, wherein the second frequency band is assigned to avoid interference with the first frequency band.

14. The computing device of claim 9, wherein the computing device is a mobile device, and wherein the trigger condition comprises any one or combination of: a location of the mobile device; or application triggers for applications on the mobile device.

15. The computing device of claim 9, wherein the computing device is further configured to:
determine that a second trigger condition has been met; and
resume utilizing the radio in the communications subsystem for the first category of communications.

16. The computing device of claim 15, wherein the trigger condition and the second trigger condition are non-symmetric.

17. A non-transitory computer readable medium for storing program code, which, when executed by a processor of a computing device, cause the computing device to:
utilize a radio in a communications subsystem of the computing device for a first category of communications;
determine that a trigger condition has been met; and
split operation of the radio in the communications subsystem, the splitting comprising utilizing a first portion of the radio for the first category of communications and a second portion of the radio for a second category of communications;
wherein the splitting comprises one of:
dividing the radio into a simultaneous dual band radio using a part of the MIMO WLAN radio as the first portion of the radio and using a remainder of the MIMO WLAN radio as the second portion of the radio, when the radio in the communications subsystem is a multiple input, multiple output (MIMO) wireless local area network (WLAN) radio; or
using one of the wideband or narrowband channels as the first portion of the radio and using the other of the wideband or narrowband channels as the second portion of the radio, when the radio in the communications subsystem is wireless local area network (WLAN) radio having simultaneous wideband and narrowband channels;
wherein the computing device is on a vehicle, and wherein the trigger condition comprises any one or combination of: a speed of the vehicle falling below a threshold; a location of the vehicle; a status of operation of the vehicle; environmental conditions; or application triggers for applications on the computing device.

* * * * *